(12) United States Patent
Bookbinder et al.

(10) Patent No.: US 6,377,724 B1
(45) Date of Patent: Apr. 23, 2002

(54) OPTICAL COMPONENT COATING

(75) Inventors: Dana C. Bookbinder, Corning;
Michelle D. Fabian, Elmira, both of NY (US)

(73) Assignee: Corning, Incorporated, Corning, NY (US)

( * ) Notice: Subject to any disclaimer, the term of this patent is extended or adjusted under 35 U.S.C. 154(b) by 0 days.

(21) Appl. No.: 09/533,316

(22) Filed: Mar. 22, 2000

(51) Int. Cl.[7] .............................. G02B 6/26; G02B 6/42
(52) U.S. Cl. ........................... 385/16; 385/19; 385/128; 385/140; 359/124; 359/128
(58) Field of Search ........................... 385/16, 17, 140, 385/128, 19; 359/124, 128

(56) References Cited

U.S. PATENT DOCUMENTS 5,353,363 A * 10/1994 Keck ........................... 385/16
5,426,714 A    6/1995 Gadkaree et al. ............. 385/39
5,946,430 A * 8/1999 Morrow ........................ 385/16
6,275,516 B1 * 8/2001 Arney .......................... 372/71

FOREIGN PATENT DOCUMENTS

EP    0311186 A1    4/1989
EP    0566801 A2    11/1992

OTHER PUBLICATIONS

"Free–Space Fiber–Optic Switches Based on MEMS Vertical Torsion Mirrors", Lee, et al J. of Lightwave Tech. IEEE vol. 17, No. 1, Jan. 1999.

* cited by examiner

Primary Examiner—Darren Schuberg
Assistant Examiner—Leo Boutsikaris
(74) Attorney, Agent, or Firm—Juliana Agon

(57) ABSTRACT

A coating and a method for protecting a flexible region of an optical device that generates different output optical signals based upon whether the region is flexed. The coating is applied to at least a portion of the region. The coating has a relaxation time that does not substantially affect the different output optical signals transmitted through the region while the region is being flexed and then unflexed.

43 Claims, 6 Drawing Sheets

OPTICAL COMPONENT COATING

BACKGROUND OF THE INVENTION

1. Field of the Invention

The present invention is generally related to optical component manufacturing and more particularly to protective coatings used in manufacturing optical components.

2. Technical Background

Variable optical attenuators (VOAs), 1×2 switches, and 2×2 switches are non-limiting examples of photonic devices which use a multiclad coupler. In these applications, the coupler requires a protective coating at the taper region to protect the coupler from breakage during the normal handling associated with assembly of the devices as well as during the functioning of the device. In the devices listed above, the coupler is flexed to attenuate the light signal propagating in the device. Any properties of the coating that degrade the optical signal are undesirable. Thus, the application of the coating must not negatively impact the attenuation response of the coupler after it is incorporated into the device.

FIG. 1 depicts an exemplary variable optical attenuator (VOA) 20 which uses a multiclad coupler 22 and a servomotor 26. Coupler 22 includes an input fiber 28 and two output fibers 30 and 32. First output fiber 30 is the output of VOA 20 and second output fiber 32 acts as a "dead-end" lead. An optical signal passes from input fiber 28 to either first output 30 or second output 32 through taper region 24 which couples the light signal from fiber 30 to fiber 32. Flexing coupler 22 at taper region 24 by different amounts via servomotor 26 causes more or less of the light signal to be transmitted to the dead-end fiber 32. The amount of flexing controls the attenuation of the signal. Thus, tapered region 24 functions as a commutator.

FIG. 2 depicts an optical step response 10 that was generated by an optical switch having a coupler without a coating in the tapered region. As depicted in FIG. 1, the tapered region is moved between a first unflexed position to a second flexed position, at the time of switching, $T_{sw}$. The first position corresponds to a signal transmission state 12 wherein the insertion loss is approximately zero. The second state corresponds to a signal attenuation state 14 wherein the insertion loss is approximately 19.3 dB. Note that the plot of the insertion loss as depicted in FIG. 1a is a square-wave. The insertion loss in both the first state and the second state is substantially constant. This is a desired response. Unfortunately, the coupler represented by FIG. 2 does not have a coating. It is unprotected and susceptible to breakage.

In one approach that has been taken, couplers have been coated with a cationic ultraviolet (UV) curable epoxy system. FIG. 3 depicts the insertion loss response 10 of the switch of FIG. 2 having a coupler that is coated with the cationic UV epoxy. Again, the tapered region is moved between a first unflexed position to a second flexed position, at the time of switching, $T_{sw}$. $IL_{swc}$ is the peak insertion loss of the coated coupler at the time of switching ($T_{sw}$). $IL_{swc}$ overshoots the insertion loss $IL_{swu}$ of the uncoated coupler in the attenuation state. $IL_{swu}$ is used a reference insertion loss value. Peak insertion loss $IL_{swc}$ is followed by hysteresis 12, which is the decay of the peak insertion loss $IL_{swc}$ to $IL_{swu}$. $IL_{\Delta sw}=|IL_{swc}-IL_{swu}|$ and represents the absolute value of the difference between the peak insertion loss of the coated coupler at the time of switching and the insertion loss of the uncoated coupler in the second state. As shown in FIG. 3, $IL_{\Delta sw}$=23 dB–19.3 dB=3.7 dB. This formula is used to accommodate a coating material that generates a peak insertion loss $IL_{swc}$ that undershoots $IL_{swu}$.

It is useful to measure hysteresis 12 in terms of its decay time $T_D$. The decay time $T_D$ is a measure of the time it takes for peak insertion loss $IL_{swc}$ to decay to $IL_{swu}$. As depicted in FIG. 3, the cationic ultraviolet (UV) curable epoxy system produces transients that have a decay time $T_D$ lasting approximately 14 seconds. As depicted, the decay of the transient hysteresis continues for several minutes. In more rigorous terms, $T_D$ is defined as $T_D=T_1-T_{sw}$, wherein $T_{sw}$ is the time at which the coupler is switched from the first state to the second state, and $T_1$ is the time at which peak insertion loss $IL_{swc}$ decays to $IL_D$. $IL_D=(0.27)IL_{\Delta sw}=(0.27)|IL_{swc}-IL_{swu}|$, which represents an exponential decay over time.

When the device is commutated from the second position to an unflexed first position at time $T_{usw}$, a second hysteresis 16 is generated. The analysis discussed above with respect to hysteresis 12 can be used to analyze hysteresis 16. As depicted, its decay time will also last several minutes. Both hysteresis 12 and hysteresis 16 are undesirable and illustrate the unwanted transients produced by the coating immediately after switch commutation. Another drawback to the cationic ultraviolet (UV) curable coating is that it is colorless. It is difficult to determine that the coating has been applied.

What is needed is a protective coating that does not generate the unwanted optical transients and hysteresis produced by earlier approaches. An optical device is needed that settles into a quiescent state immediately after commutation. Furthermore, the protective coating should include a tinted material. Since clarity is important, the tinted material should allow internal areas in the coupler to be viewed through the coating.

SUMMARY OF THE INVENTION

The present invention overcomes the aforementioned disadvantages as well as others. In accordance with the teachings of the present invention, the coating protects optical devices without generating unwanted optical side effects during flexing. The coating adheres readily to the glass of the waveguide component. The coating has a tint so that it can be readily ascertained that the coating has been applied, but also has sufficient clarity so that the internal areas in the component may be viewed. In one embodiment a UV coating cures to a tack free state in air so that a nitrogen blanket is not required during the cure. A solvent based coating such as a lacquer can also be used. The coating also does not degrade when exposed to relatively severe environmental conditions.

One aspect of the present invention is an optical device for directing a light signal. The optical device includes a commutation region movable between a first position corresponding to a signal transmission state, and a second position corresponding to a signal attenuation state. A protective coating is disposed on the commutation region that does not substantially introduce insertion loss transients when the commutation region is moved between the first position and the second position.

In another aspect, the present invention includes a method of directing a light signal in an optical device having a first output, and a commutation region movable between a first position corresponding to a signal transmission state, and a second position corresponding to a signal attenuation state. The method includes the steps of applying a protective coating onto the commutation region. Directing a light signal into the optical device. Moving the commutation region from the first position to the second position to thereby attenuate the light signal in the first output, whereby the protective coating does not substantially produce insertion loss transients in the optical device.

In yet another aspect, the present invention includes a method of fabricating an optical device, the optical device having a commutation region movable between a first position corresponding to a signal transmission state, and a second position corresponding to a signal attenuation state. The method including the steps of providing a coating material. Applying the coating material to the commutation region, wherein the coating material does not substantially produce insertion loss transients when the commutation region is moved between the first position and the second position.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
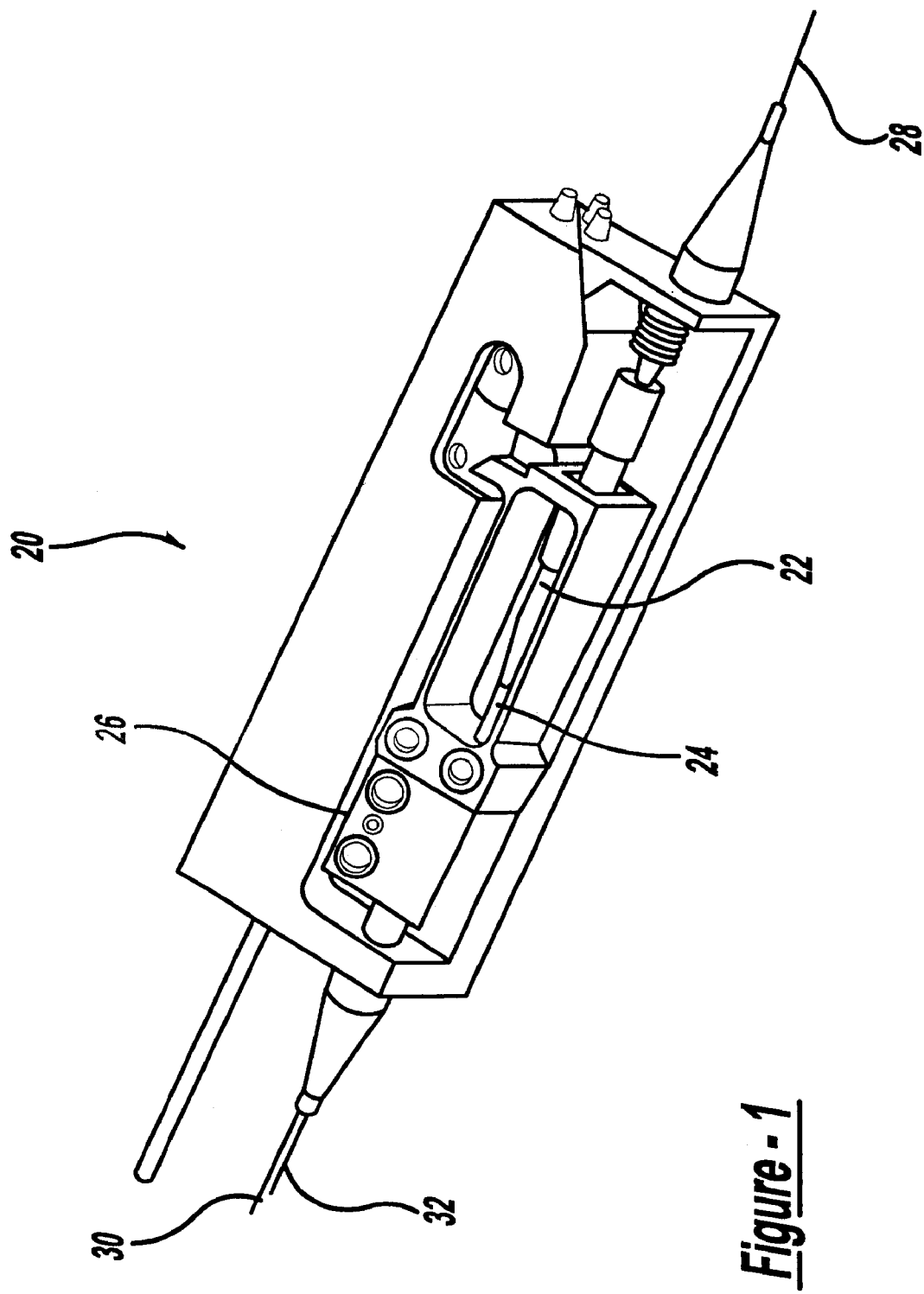
FIG. 1 is a perspective view of a variable optical attenuator having a tapered region, in accordance with the present invention.

Reference will now be made in detail to the present preferred embodiments of the invention, an example of which is illustrated in the accompanying drawings. Wherever possible, the same reference numbers will be used throughout the drawings to refer to the same or like parts. An exemplary embodiment of the optical device of the present invention is shown in FIG. 1, and is designated generally throughout by reference numeral 20.

In accordance with the invention, the present invention for a protective coating for optical components includes a commutation region that is flexed between a first position and a second position. The first position corresponds to a signal transmission state having negligible insertion loss. The second position corresponds to a signal attenuation state. One of ordinary skill in the art will recognize that the device can be flexed over a range of positions depending on the required degree of attenuation. A protective coating is disposed on the commutation region that does not substantially alter an insertion loss characteristic of the optical device when the commutation region is moved between the first position and the second position. In other words, any transients or hysteresis generated by the coating during commutation have a duration of less than one second.

As embodied herein and depicted in FIG. 1, a perspective view of a variable optical attenuator 20 is shown. In accordance with the present invention, coupler 22 has a protective coating disposed on tapered region 24. The protective coating of the present invention protects coupler 22 from breakage due to handling during device assembly, and during flexure when the device is commutated. As discussed above, the protective coating does not generate the unwanted optical transients and hysteresis of earlier approaches. One of ordinary skill in the art will recognize that the protective coating compositions of the present invention is not limited to the VOA depicted in FIG. 1, but rather includes all types of photonic components that may undergo flexing. For example, a 2×2 switch commutated by a flexing motion can use the protective coating compositions of the present invention.

Figure 4:
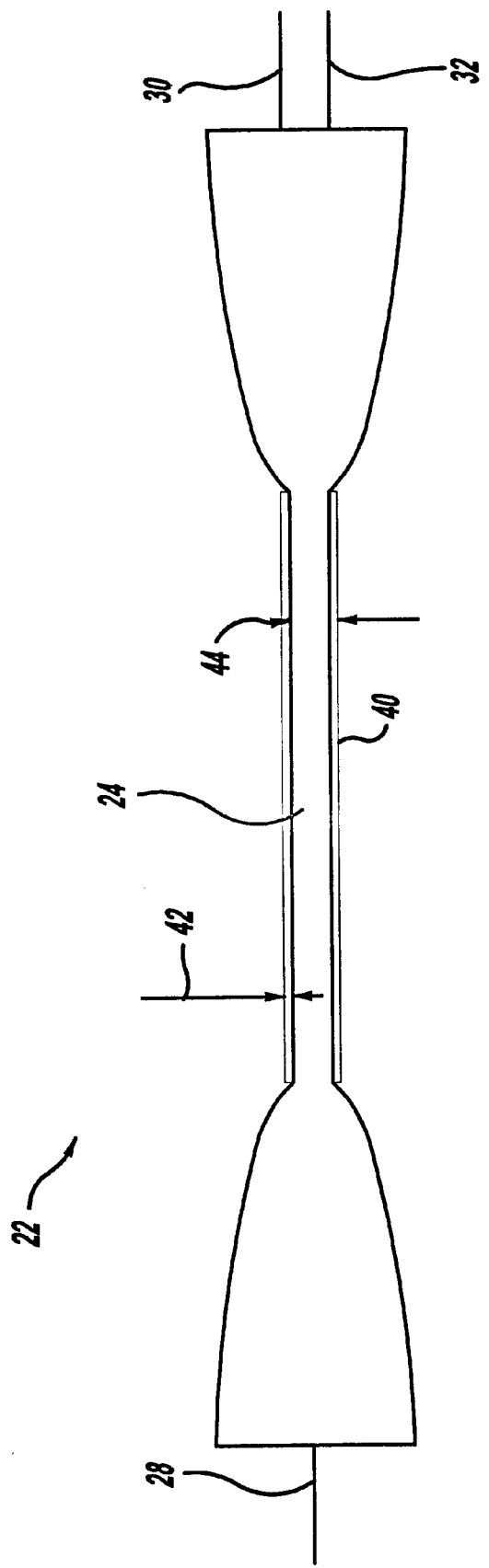
FIG. 4 is a detail view of a multiclad coupler having a coating in accordance with the present invention.

FIG. 4 is a detail view of the type of multiclad coupler 22 that is used in the optical device depicted in FIG. 1. As embodied herein and depicted in FIG. 4, coupler 22 has a flexible acrylate coating 40 that is disposed on tapered region 24. Flexible acrylate coating 40 has a thickness 42. In this embodiment, coating thickness 42 is approximately 25 microns and coupler thickness 44 is approximately 65 millimeters.

EXAMPLE

The invention will be further clarified by the following example which is intended to be exemplary of the invention. The protective coating of the present invention is a low viscosity, low modulus, flexible acrylate coating that is cured in air to a tack free state. The coating is based on an acrylate oligomer and monomers that are available from such suppliers as Sartomer Corporation. The oligomer is CN 966 180 which is an aliphatic urethane acrylate oligomer blended in an 80:20 ratio with propoxylated neopentyl glycol diacrylate monomer in order to reduce the viscosity of the oligomer. This oligomer is a highly flexible material which provides the low modulus desired in the switch application while the flexibility enhances the adhesion of the coating to the coupler. The coating composition of the present invention as depicted in FIG. 4 is shown in Table 1:

TABLE 1

| Material | Level (phr) | Exemplary Supplier |
| --- | --- | --- |
| CN 966 I80 | 30 | Sartomer Corporation |
| SR-501 | 30 | Sartomer Corporation |
| SR-9003 | 40 | Sartomer Corporation |
| Irgacure 1850 | 3 | Ciba Corporation |
| Irganox 1035 | 2 | Ciba Corporation |
| Resiflow LG-99 | 2 | Estron Chemical |
| A-174 Silane | 4 | OSi Corporation |
| Triphenylphosphine | 5 | Aldrich Chemical |
| PCB-1 | 3 | Corning ICA Lab |

(Note: "phr" indicates parts per hundred resin).

SR-9003 is propoxylated neopentyl glycol diacrylate. This difunctional monomer serves as a reactive diluent.

SR-501 is propoxylated trimethylolpropane triacrylate and provides a fast cure response. These monomers' properties include water resistance, abrasion resistance and good adhesion.

The remainder of the formulation includes various additives with different functions. Irgacure 1850 from Ciba is a photoinitiator. It is a 50:50 blend of bis (2,6-dimethoxybenzoyl)-2,4,4-trimethyl pentyl phosphine oxide and 1-hydroxy-cyclohexyl-phenyl-ketone. Its function is to absorb the UV light and initiate the polymerization reaction by generating free radicals. Irganox 1035 is also supplied by Ciba and is an antioxidant used to protect the coating against thermal yellowing and degradation. Resiflow LG-99 is an acrylate functional flow and wetting agent from Estron Chemical. It provides good wetting to the glass as well as aids in the leveling of the coating after application which helps to ensure a smooth even layer.

The A-174 is a methacrylate functional silane coupling agent from OSi Corporation. It provides increased adhesion to the glass and is particularly useful for maintaining adhesion after high humidity exposure. Triphenylphosphine, from Aldrich, has been added to overcome the oxygen inhibition at the surface of the coating when cured in air. This additive allows the coating to be cured to a tack free state in air without having to resort to the use of a nitrogen blanket to provide an inert atmosphere, thus making the use of this coating in a production environment easier.

The PCB-1 is a Corning developed pigment dispersion. The function of the dispersion is to provide enough color so that the coating is visible after application. The use of a very small particle size transparent (<0.5 micron) pigment helps to ensure that the coating retains the clarity needed for viewing the air lines (Note: some pigments have particle sizes this small but are opaque pigments, for example, $TiO_2$). The composition for this dispersion is provided in Table 2:

TABLE 2

| Material | Level (phr) | Exemplary Supplier |
|---|---|---|
| Hostaperm Blue B2G | 20 | Clariant |
| SR-9003 | 80 | Sartomer Corporation |
| Disperbyk 164 (60% solids) | 15 | BYK Chemie |

The pigment is a copper pthalocyanine blue pigment (CI 15:3) from Clariant. Disperbyk 164 is a proprietary polymeric dispersing agent supplied by BYK Chemie at a 60% solids loading in butyl acetate. The function of the dispersing agent is to provide steric stabilization of the pigment particles once they are dispersed into the monomer. Finally, the monomer used in the dispersion is the SR-9003. It was chosen for its relatively low surface tension which results in good pigment wetting. One of ordinary skill in the art will recognize that the present invention is not limited to the above described pigment dispersion, but can also include the use of any commercially supplied pigment dispersion or dye that achieves the tint requirement. For example, a dispersion source from US Colors and Coatings can also be used.

The modulus of elasticity of coating 40 is approximately $3.1 \times 10^8$ Pa (modulus at 25° C.), and the viscosity range of coating 40 is 200 to 600 centipoises (cps). One of ordinary skill in the art will recognize that alternate embodiments of the present invention include modulus of elasticity values of $4.0 \times 10^8$ Pa (modulus at 25° C.) and higher. Furthermore, one of ordinary skill in the art will recognize that the present invention is not limited to these values, but rather such values vary depending on application and other physical properties such as creep, and stress relaxation.

Coating 40 performed well under environmental testing and did not exhibit degradations such as delamination from the glass, flaking, adhesion problems, or peeling. Overall, coating 40 of the present invention is a low viscosity, low modulus, flexible acrylate coating that cures rapidly to a tack free state in air.

Figure 5:
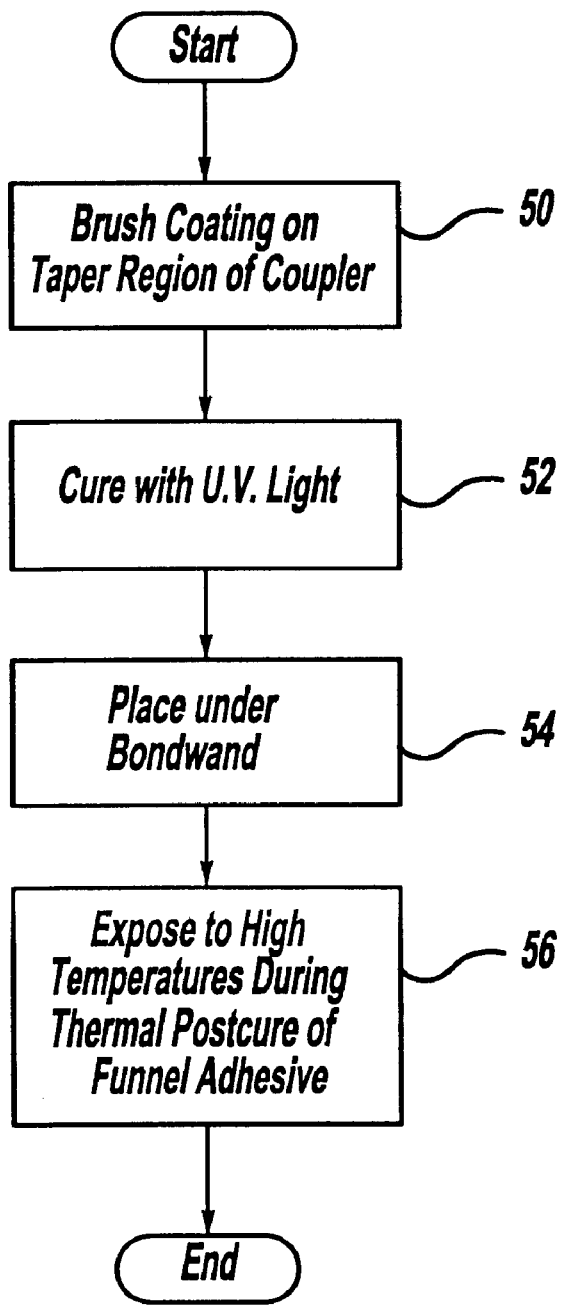
FIG. 5 a flowchart depicting the steps associated with applying the coating of the present invention to an exemplary optical component.

As embodied herein and depicted in FIG. 5, a process for applying coating 40 to coupler 22 is shown. The coating application process starts at step 50 wherein a brush is used to apply coating to the taper region of a coupler. The coating is cured at step 52. In the preferred embodiment, the coating is cured for approximately 90 seconds with a UV light source, such as with a Lessco Superspot UV light. The coating is placed under a Bondwand for preferably approximately 30 minutes at step 54. Finally, the coating is exposed to 125° C. for 4 hours during thermal postcure of the funnel adhesive at step 56. One of ordinary skill in the art will recognize that the present invention is not limited only the above-described parameters but includes operating the process with parameters sufficient to achieve the intended effect. For example, in alternate embodiments, the protective coating of the present invention are a solvent based coatings or lacquers.

Figure 2:
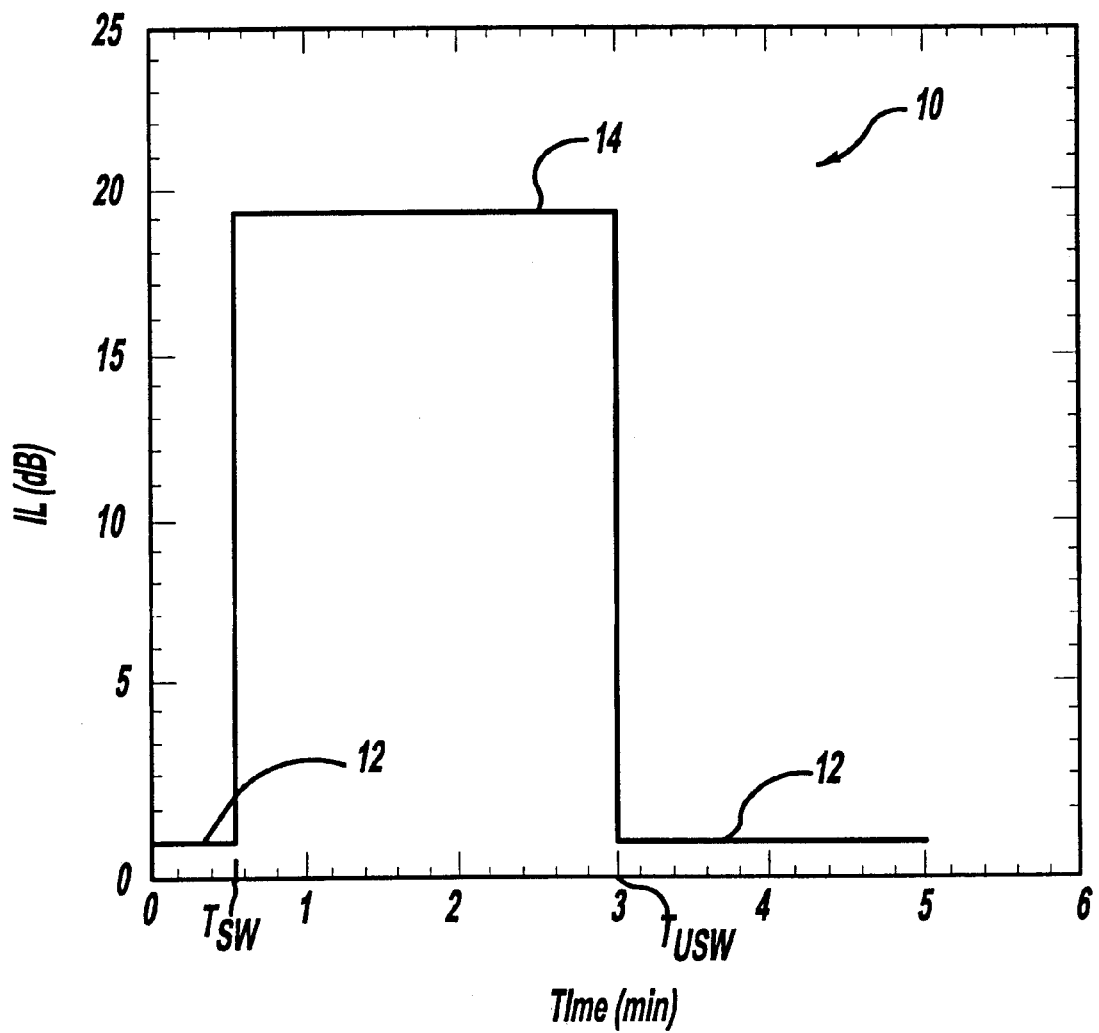
FIGS. 2 is a plot of insertion loss with respect to time, illustrating the optical response of an optical device without a coating.
Figure 3:
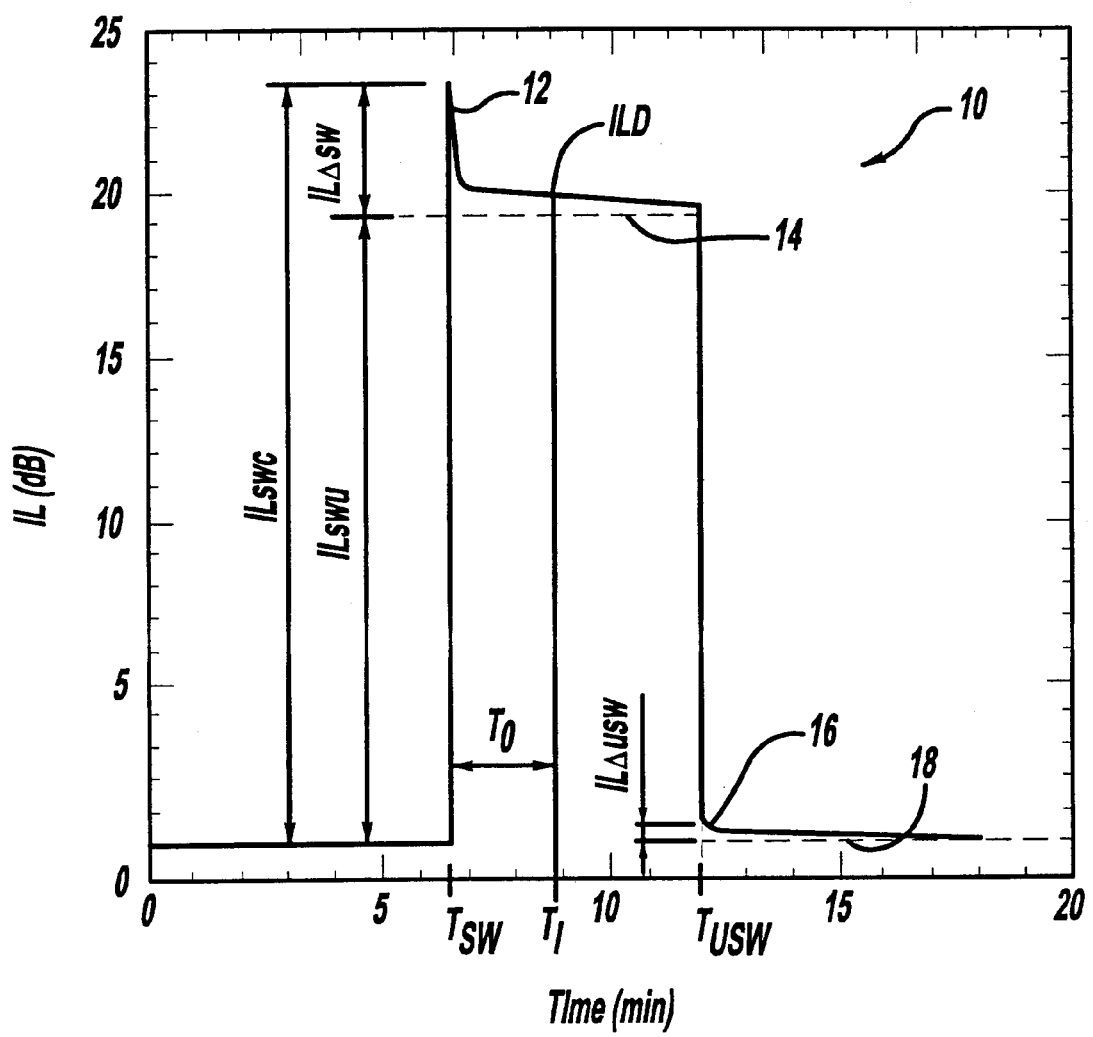
FIGS. 3 is a plot of insertion loss with respect to time, illustrating the optical response of an optical device having a cationic ultraviolet (UV) curable epoxy coating.
Figure 6:
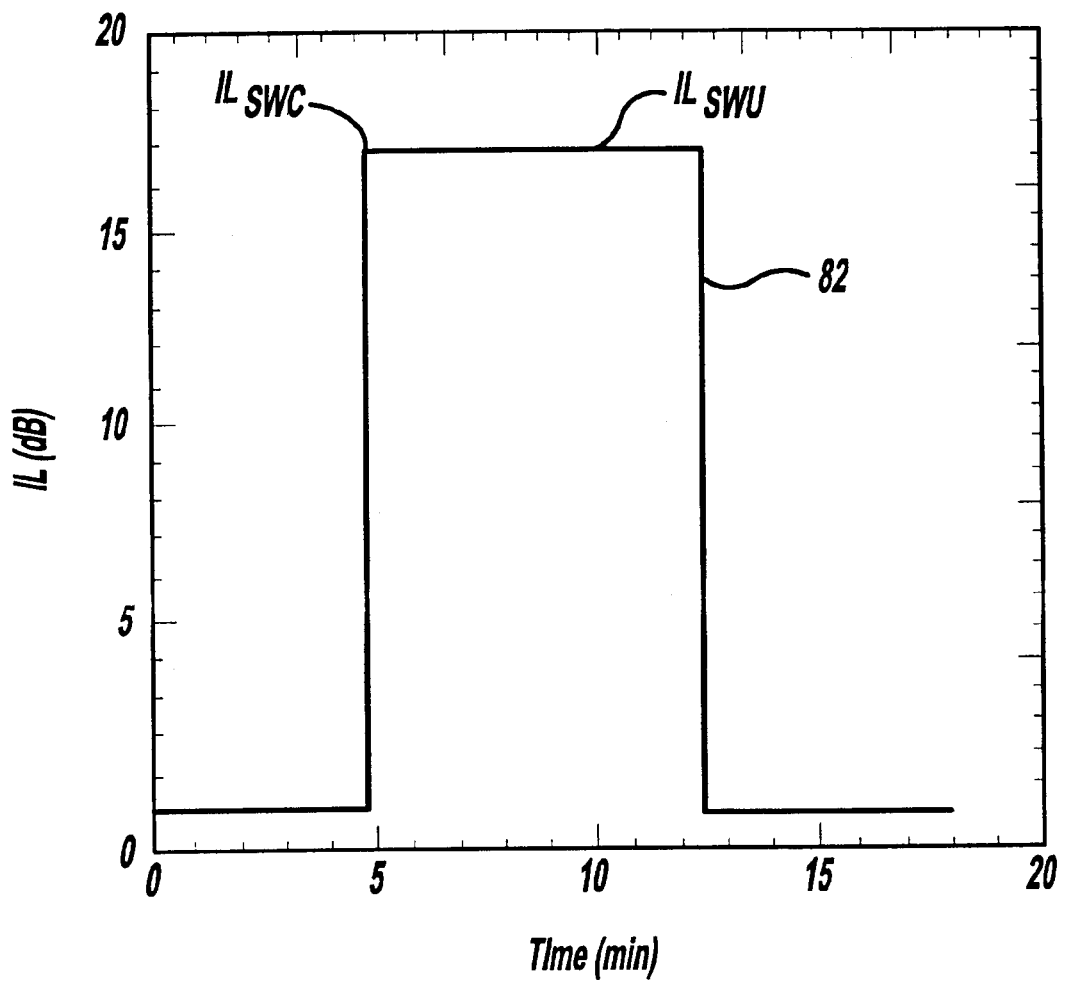
FIGS. 6 is a plot of insertion loss with respect to time, illustrating the optical response of an optical device having a coating in accordance with the present invention.

As discussed above, FIG. 2 depicts the optical step response 10 of an optical device 20 that uses a coupler without a coating in the tapered region. As embodied herein and depicted in FIG. 6, a plot of insertion loss with respect to time, illustrating the response 82 of an optical device having coating 40 in accordance with the present invention is disclosed. FIG. 6 illustrates the advantages of the present invention, and in particular the substantial reduction of the hysteresis effect by the coating of the present invention.

Using the terminology developed above, FIG. 6 shows a peak insertion loss $IL_{swc}$ of the coated coupler at time $T_{sw}$ of approximately 17.03 dB. As shown, $IL_{swc}$ overshoots the insertion loss $IL_{swu}$ of the uncoated coupler (16.93 dB) by 0.1 dB. Thus, $IL_{\Delta sw} = |IL_{swc} - IL_{swu}| = 0.1$ dB. In terms of decay time $T_D$, the optical device employing coating 40 of the present invention exhibited a decay time $T_D$ of approximately 0.9 seconds.

One of ordinary skill in the art will understand that there are numerous applications and implementations for the present invention. For example, the coating formulation of the present invention includes any type of UV curable formulation cured by either a free radical or cationic polymerization mechanism. For example, the coating formulation of the present invention includes such materials that cure cationically as epoxies and vinyl ethers. Other coating formulations include free radical cationic hybrids so that the advantages inherent in both chemistries can be realized. Also, the present invention includes using UV cure/thermal hybrids. The UV cure portion provides for a quicker process cure while the thermal portion cures during the 4 hour 125° C. thermal postbake (i.e., during step 56 of FIG. 5). One of ordinary skill in the art will also recognize that lacquer or solvent based coatings including thermoset or thermoplastic polymer formulations are within the scope of the present invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical device for directing a light signal, said optical device comprising:
a commutation region movable between a first position corresponding to a signal transmission state, and a second position corresponding to a signal attenuation state; and
a protective coating disposed on the commutation region that does not substantially introduce insertion loss transients when the commutation region is moved between the first position and the second position.

2. The optical device of claim 1, wherein the protective coating does not substantially produce an insertion loss hysteresis when the commutation region is moved between the first position and the second position.

3. The optical device of claim 2, wherein the insertion loss hysteresis includes a peak insertion loss that is less than 1 dB in excess of a reference insertion loss value, the difference of the peak insertion loss and the reference insertion loss defining an insertion loss overshoot, wherein the reference insertion loss value is defined as an insertion loss value of an uncoated optical device in the signal attenuation state.

4. The optical device of claim 3, wherein the peak insertion loss is less than 0.1 dB in excess of the reference insertion loss value.

5. The optical device of claim 2, wherein the insertion loss hysteresis has a decay time of less than 14 seconds, the decay time being an exponential decay period measured from an occurrence of the peak insertion loss to a point in time when the insertion loss equals a value 0.27 times the insertion loss overshoot.

6. The optical device of claim 5, wherein the decay time is less than one second.

7. The optical device of claim 5, wherein the decay time is approximately 0.9 seconds.

8. The optical device of claim 1, wherein an insertion loss of the optical device in the signal attenuation state is substantially constant.

9. The optical device of claim 8, wherein a variation of the insertion loss of the optical device in the signal attenuation state is less than 3.7 dB.

10. The optical device of claim 8, wherein a variation of the insertion loss of the optical device in the signal attenuation state is less than approximately 0.1 dB.

11. The optical device of claim 1, wherein an insertion loss of the optical device with respect to time is substantially a unit step function when the optical device is switched between the signal transmission state and the signal attenuation state.

12. The optical device of claim 1, wherein an insertion loss of the optical device with respect to time is a square-wave shape when the optical device is switched between the signal transmission state and the signal attenuation state.

13. The optical device of claim 1, wherein the optical device is a variable optical attenuator.

14. The optical device of claim 13, wherein the variable optical attenuator includes an optical coupler.

15. The optical device of claim 14, wherein the commutation region is a tapered region on the coupler.

16. The optical device of claim 1, wherein the optical device is a 1×N switch, wherein N is an integer greater than one.

17. The optical device of claim 1, wherein the optical device is a 2×2 switch.

18. A method of directing a light signal in an optical device having a first output, and a commutation region movable between a first position corresponding to a signal transmission state, and a second position corresponding to a signal attenuation state, said method comprising the steps of:
applying a protective coating onto the commutation region;
directing a light signal into the optical device; and
moving the commutation region from the first position to the second position to thereby attenuate the light signal in the first output, whereby the protective coating does not substantially produce insertion loss transients in the optical device.

19. The method of claim 18, wherein the step of moving includes splitting the light signal between the first output and a second output.

20. The method of claim 19, wherein the step of moving includes switching the light signal between the first output and the second output.

21. A method of fabricating an optical device, the optical device having a commutation region movable between a first position corresponding to a signal transmission state, and a second position corresponding to a signal attenuation state, said method comprising the steps of:
providing a coating material; and
applying the coating material to the commutation region, wherein the coating material does not substantially produce insertion loss transients when the commutation region is moved between the first position and the second position.

22. The method of claim 21, wherein the optical device is a variable optical attenuator.

23. The method of claim 21, wherein the commutation region is a tapered region of a optical coupler.

24. The method of claim 23, wherein the coupler is a multiclad coupler.

25. The method of claim 23, wherein the step of applying includes applying the coating on a tapered region of an optical coupler.

26. The method of claim 21, wherein the step of providing further comprises the step of preparing the coating from an oligomer and a monomer.

27. The method of claim 21, wherein the step of providing further comprises the step of preparing the coating from an acrylate oligomer and a propoxylated neopentyl glycol diacrylate monomer.

28. The method of claim 27, wherein the acrylate oligomer is an aliphatic urethane acrylate oligomer.

29. The method of claim 27, wherein the step of preparing the coating includes using an additive to facilitate reaction of the oligomer and the monomer in an air atmosphere.

30. The method of claim 29, wherein the step of applying further comprises the step of curing the coating to a tack free state in the air atmosphere.

31. The method of claim 21, wherein the step of providing further comprises the step of preparing the coating from a difunctional monomer, wherein the difunctional monomer serves as a reactive diluent.

32. The method of claim 31, wherein the difunctional monomer comprises a propoxylated neopentyl glycol diacrylate monomer.

33. The method of claim 21, wherein the step of providing further comprises the step of preparing the coating from a propoxylated trimethylolpropane triacrylate.

34. The method of claim 21, wherein the step of providing further comprises the step of preparing the coating from a photoinitiator, wherein the photoinitiator absorbs UV light and initiates a polymerization reaction by generating free radicals.

35. The method of claim 34, wherein the photoinitiator is a 50:50 blend of bis (2,6-dimethoxybenzoyl)-2,4,4-trimethyl pentyl phosphine oxide and 1-hydroxy-cyclohexyl-phenyl-ketone.

36. The method of claim 21, wherein the step of providing further comprises the step of preparing the coating from an antitoxidant to protect the coating from environmental degradation.

37. The method of claim 21, wherein the step of providing further comprises the step of preparing the coating from an acrylate functional flow and wetting agent.

38. The method of claim 21, wherein the step of providing further comprises the step of preparing the coating from a methacrylate functional silane coupling agent.

39. The method of claim 21, wherein the step of providing further comprises the step of preparing the coating from Triphenylphosphine, for overcoming oxygen inhibition at a surface of the coating when the coating is cured in air.

40. The method of claim 21, wherein the step of providing includes providing a coating that includes a tinting material.

41. The method of claim 21, wherein the step of applying further comprises the steps of:
   curing the coating with UV light;
   placing the commutation region under a bondwand; and
   heating the commutation region.

42. The method of claim 21, wherein the step of providing includes providing a solvent based coating.

43. The method of claim 42, wherein the solvent based coating is a lacquer.

* * * * *